United States Patent [19]

Milding

[11] 4,329,079
[45] May 11, 1982

[54] COUPLING DEVICE

[75] Inventor: Ebbe G. Milding, Mölnlycke, Sweden

[73] Assignee: Molnlycke AB, Gothenburg, Sweden

[21] Appl. No.: 119,430

[22] Filed: Feb. 7, 1980

[30] Foreign Application Priority Data

Feb. 16, 1979 [SE] Sweden .............................. 7901392

[51] Int. Cl.³ .............................................. F16B 1/00
[52] U.S. Cl. .................................. 403/319; 403/331; 403/363; 24/207
[58] Field of Search ........... 24/230 BC, 201 HH, 207, 24/211 L; 52/586, 581, 584, 575; 403/331, 363, 364, 319, 294; 160/235, 229 R

[56] References Cited

U.S. PATENT DOCUMENTS

| 3,363,386 | 1/1968 | Elflein et al. | 52/586 |
| 3,823,525 | 7/1974 | Bruun | 52/584 |
| 3,875,623 | 4/1975 | Johnston | 24/230 BC |
| 4,218,047 | 8/1980 | Douglas | 256/1 |

FOREIGN PATENT DOCUMENTS

| 36371 | 6/1973 | Australia | 160/235 |
| 2120449 | 12/1971 | Fed. Rep. of Germany | 52/586 |
| 400526 | 4/1966 | Switzerland | 160/235 |

Primary Examiner—Andrew V. Kundrat
Attorney, Agent, or Firm—Young & Thompson

[57] ABSTRACT

A device for releasably coupling together various objects includes a first profiled tube mounted on a first object, a second profiled tube mounted on a second object to be coupled together with the first object, and a locking rod. The tubes are essentially identical at least in their cross section and have a longitudinal open slot with smaller width than the cross section of the tubes. For coupling, a first circumferential portion of the first tube is inserted through the slot in the second tube, while a circumferential portion of the second tube is inserted through the slot in the first tube. Inside each tube the circumferential portion of the coacting tube is brought into contact with a portion of the interior boundary surface of the respective tube, so that the two tubes will form a sleeve-like unit. The locking rod is inserted into a cavity in this unit to lock the two tubes to each other.

6 Claims, 7 Drawing Figures

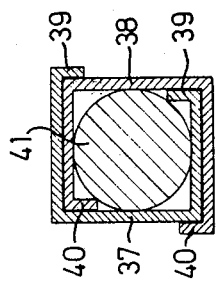
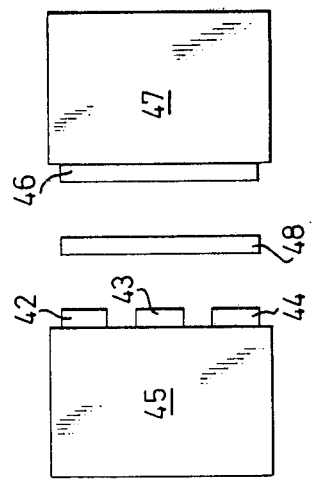
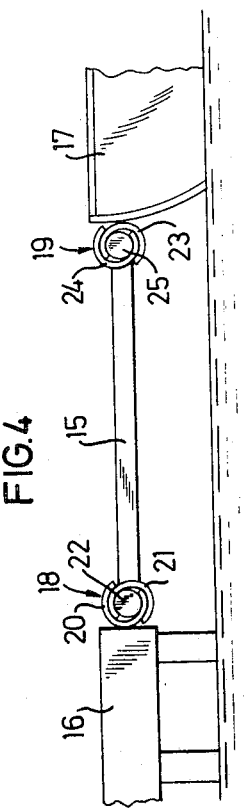
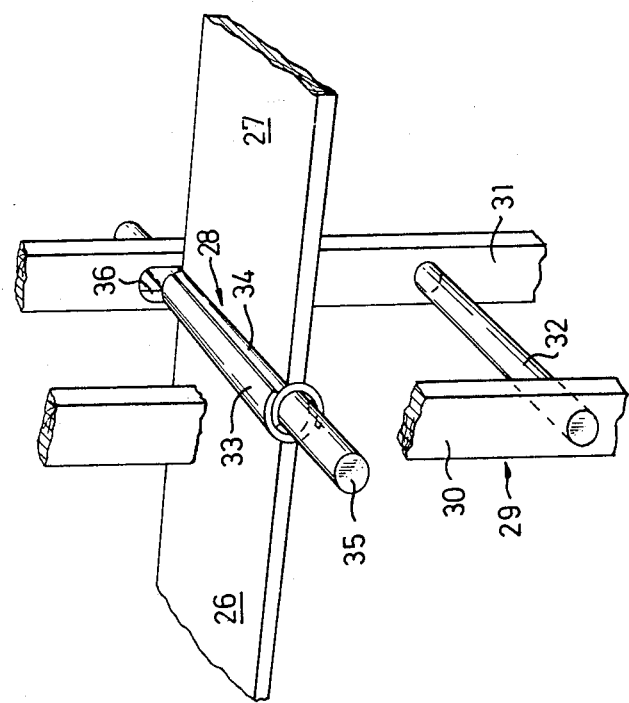

COUPLING DEVICE

Coupling devices for coupling together various objects are to be found in many forms. A feature common to all of these devices is that the coupling members, which are joined to the objects to be coupled, are of different construction, for example in the form of a male and a female member. This means that only objects with compatible coupling members can be connected. This disadvantage is especially significant when a large number of objects are to be coupled together into a larger unit.

When the various sections are identical, it is of course a disadvantage that the coupling members fixed to the sections cannot be identical.

The new coupling device according to the invention has completely eliminated the above disadvantages.

The primary features of this new coupling device are that it comprises a first profiled tube, a second profiled tube and a locking rod, the first tube having, along its entire length, an open slot with a width dimension which is less than the cross-sectional dimension of the tube, the second tube having the same cross-sectional shape and cross-sectional size as the first tube, and both tubes being insertable into each other via the slots, so that a first circumferential portion of the first tube grasps around a first circumferential portion of the second tube, and so that a second circumferential portion of the second tube grasps around a second circumferential portion of the first tube, and so that the two tubes form together a sleeve-like unit, into the cavity of which the locking rod can be inserted to lock the tubes to each other, said locking rod being clamped between the second circumferential portion of the first tube and the first circumferential portion of the second tube.

In one suitable embodiment, the profiled tubes have a cross section which has at least essentially the shape of an arc of a circle while the locking rod has a cross section which is at least essentially circular, with a diameter which more or less corresponds to the inner diameter of the profiled tubes. Thus the tubes will be rotatable relative to each other when locked together.

The profiled tubes are suitably relatively thin-walled and made of an elastic material. They will thus be compressible and expandable transversely, which will facilitate their coupling together.

An additional embodiment of the coupling device according to the invention involves a number of first profiled tubes mounted collinearly on a first object, one or more second profiled tubes mounted collinearly on a second object, and a locking rod which, when placed in position, extends through all of the profiled tubes.

The invention will be explained below in more detail with reference to several examples illustrated in the accompanying drawings.

FIG. 2 shows a cross section through a coupling device composed of the members shown in FIG. 1, while FIGS. 3, 4 and 5 show in schematic form various examples of uses for the coupling device shown in FIGS. 1 and 2.

FIG. 6 shows a cross section of an assembled coupling device according to a modified embodiment of the invention, while FIG. 7 finally shows an additional example of a coupling device according to the invention.

Figure 1:
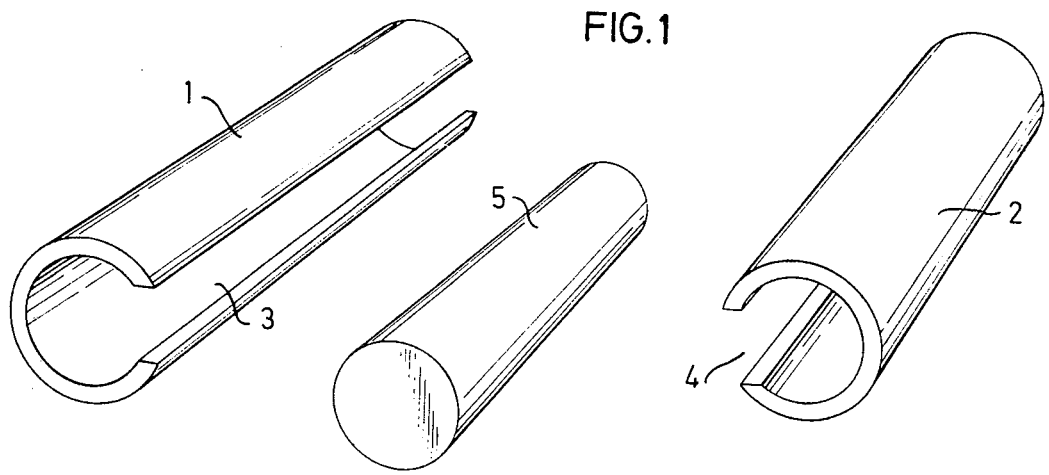
FIG. 1 shows a perspective view of the members comprising the coupling device according to the invention.
Figure 2:
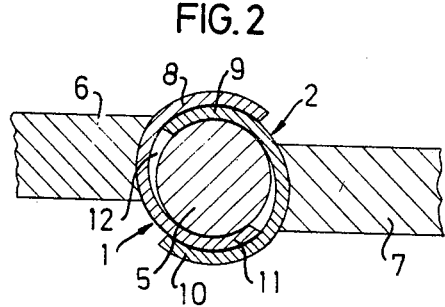

As can be seen most clearly from FIGS. 1 and 2, a coupling device according to the invention consists of two profiled tubes 1,2 and a locking rod 5. Each of the two tubes has along its entire length a longitudinal open slot 3,4. FIG. 2 shows this coupling device assembled for joining two objects 6,7, each of which is rigidly fixed to one of the profiled tubes 1,2. When assembled, a first circumferential portion 8 of the first tube 1 grasps around a first circumferential portion 9 of the second tube 2, while a second circumferential portion 10 of the second tube 2 grasps around a second circumferential portion 11 of the first tube 1. The locking rod 5 is inserted into the cavity 12 thus created between the tubes, so that it is held both by the first circumferential portion 9 of the second tube 2, and by the second circumferential portion 11 of the first tube 1.

The profiled tubes 1,2 are suitably thin-walled and made of an elastic material. The diameter of the locking rod 5 is suitably of such a size that the circumferential portions 9,11 of the tube, which touch against the rod, are forced slightly diametrically outwards when the rod is inserted and will thereafter lie pressing against the rod in a resilient manner.

Figure 3:
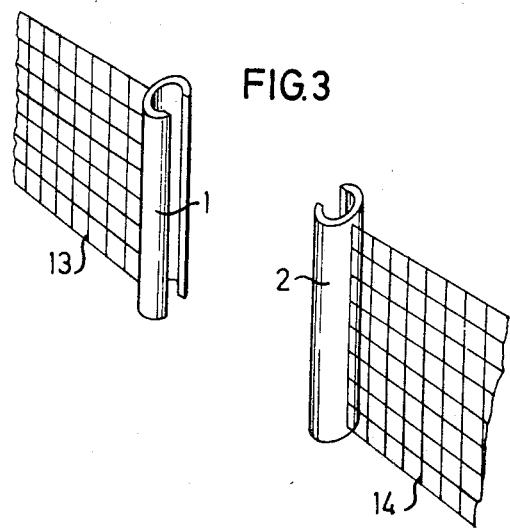

The coupling device shown in FIGS. 1 and 2 can be used, for example, for releasable joining of two sections of wire fence. This is shown in FIG. 3 in which the two sections of fence are labelled 13 and 14. Such a fence connection is suitable at such places where one would normally have a fence but where one still wishes to have the possibility of temporarily opening the same, to occasionally allow a vehicle to pass through it, for example.

FIG. 4 shows how two coupling devices of the embodiment shown in FIG. 1 can be used to secure a gangplank 15 between a dock 16 and a boat 17 tied to the dock. The coupling devices were labelled collectively 18 and 19. A first profiled tube 20 is securely mounted to the dock 16. This tube is coupled by means of a locking rod 22 to a second profiled tube 21 which is securely mounted on the gangplank 15. A first tube 23 is likewise securely attached to the boat 17, and a second tube 24 is securely mounted on the gangplank 15. A locking rod 25 is inserted in the cavity between these two profiled tubes which are hooked together.

The profiled tubes in the coupling devices shown in FIGS. 1–4 have cross sections essentially in the shape of an arc of a circle, and this makes them rotatable in relation to each other around the locking rods in each coupling. Thus, in the example with the gangplank in FIG. 4, there will be no torsional stresses in the couplings 18, 19 due to waves or movement of passengers on the boat or on the gangplank.

A coupling device according to the invention is also usable in connection with scaffolds. FIG. 5 shows schematically a portion of a scaffold where two horizontal planks 26,27 are joined together by means of a coupling device 28 according to the invention and are carried by vertical ladders 29, only one of which is shown in the figure. This ladder 29 consists of two uprights 30,31 and ladder dowels 32 running between them. For the sake of clarity, one of the uprights 30 is shown broken to reveal the coupling device 28. This device consists of a first profiled tube 33 which is rigidly joined to one of the planks 26, a second profiled tube 34 rigidly joined to the other plank 27, and a locking rod 35. This rod extends, when inserted in the coupling, out on both sides of the tubes and is designed, as can be seen from FIG. 5, to be inserted in slots 36 in the uprights 30,31 to support the planks in addition to serving as a locking rod for the tubes 33,34.

In the embodiment shown in FIG. 6 of a coupling device according to the invention, the profiled tubes 37,38 are essentially U-shaped with longitudinal flanges 39,40. The locking rod 41 in this embodiment has a circular cross section as well. The two profiled tubes 37,38 are at least essentially identical and relatively thin-walled and made of an elastic material. Since they are thin-walled and elastic, they can be put together so as to grip over each other, with one of their flanges 39,40 gripping over a portion of the cooperating tube. The profiled tubes 37,38 in the coupling device shown in FIG. 6 are not rotatable relative to each other when coupled together. Thus this embodiment for the coupling device according to the invention is suitable for use when a rigid joint between two objects is desired.

In the embodiment shown in FIG. 7, the coupling device consists of a number of short, first profiled tubes 42,43,44, which are rigidly mounted and spaced collinearly on an object 45; a long second profiled tube 46, which is rigidly joined to a second object 47; and a locking rod 48. All of the tubes 42,43,44,46 have essentially the same cross-sectional shape as the tubes shown in FIG. 1. For coupling, the long tube 46 is brought into engagement with the short tubes 42,43,44, and the locking rod 48, the length of which at least essentially agrees with the length of the long tube 46, is inserted into the cavities created between the various tubes.

The invention is not limited to the examples of embodiments described above and shown in the drawings. Rather, it can be modified in many different ways within the scope of the claims.

For example, the circular-arc-shaped profiled tubes shown in FIGS. 1–5 need not be made of an elastic material; they can also be made of an essentially rigid material, such as a light-metal alloy or the like.

What I claim is:

1. Coupling device comprising at least two profiled tube-like elements and a locking rod, one of the tube-like elements being attached to a first object and the other element being attached to a second object to be connected together with the first object, each of said tube-like elements having along its entire length an open slot opposite its respective object with a width dimension less than the largest internal cross-sectional dimension of the elements and arranged symmetrically on each element defining an outwardly-directed opening, both tube-like elements being insertable into each other via their open slots, so that a first circumferential portion of the one element grasps around the outer periphery of the first circumferential portion of the other element, and so that the second circumferential portion of the other element grasps around the outer periphery of the second circumferential portion of the one element, and so that the tube-like elements form together a sleeve-like unit, into the cavity of which the locking rod can be inserted to lock the tubes to each other, said locking rod being clamped between the second circumferential portion of the one tube-like element and the first circumferential portion of the other tube-like element, said tube-like elements being made of an elastic material and being relatively thin walled, so that they are traversely compressible and expandable by said locking rod.

2. Coupling device according to claim 1, in which in the assembled condition of said elements, said first portion of said other element is externally exposed and said first portion of said one element is freely rotatably slidable thereover, and said second portion of said one element is exposed and said second portion of said other element is freely rotatably slidable thereover, whereby said elements are rotatable relative to each other.

3. Coupling device according to claim 1, in which said first portion of said one element has a free end edge which is externally exposed and which is spaced from said second object, and said second portion of said other element has a free end edge which is externally exposed and which is spaced from said first object, whereby said first and second objects have freedom to oscillate relative to each other about said locking rod.

4. Coupling device according to claim 1, in which said tube-like elements have the same cross-sectional shape and cross-sectional size as each other and are in the form of an arc of a circle, said objects being secured to the center of the arc and spaced a substantial distance from the ends of said arc whereby each tube-like element has a substantial extent of part-cylindrical surface externally exposed on each side of its associated said object.

5. Coupling device according to claim 1, characterized in that the profiled tube-like elements have cross sections which are at least essentially in the form of an arc of a circle, while the locking rod has a cross section which is at least essentially circular with a diameter which is essentially equal to the inner diameter of the profiled tube-like elements, whereby the tube-like elements, when locked to each other, are rotatable with respect to each other.

6. Coupling device according to claim 1, characterized in that it comprises a plurality of first profiled tube-like elements, securely mounted collinearly on a first object, one or more second profiled tube-like elements rigidly and collinearly mounted on a second object, and a locking rod, the first and second tube-like elements being designed to be coupled together with the locking rod extending through all of the tube-like elements.

* * * * *